(No Model.)
L. J. PHELPS.
INFLATABLE TUBE.
No. 472,485. Patented Apr. 5, 1892.
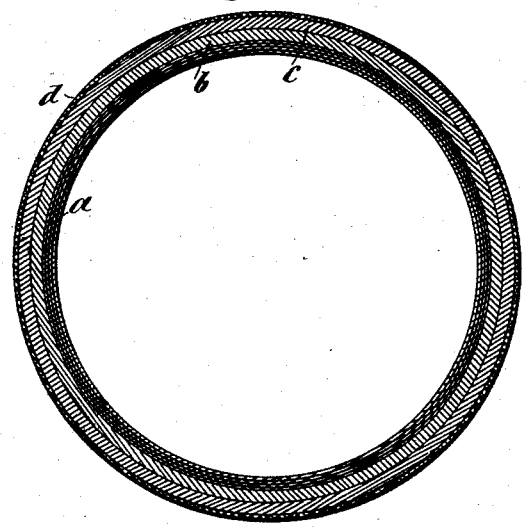
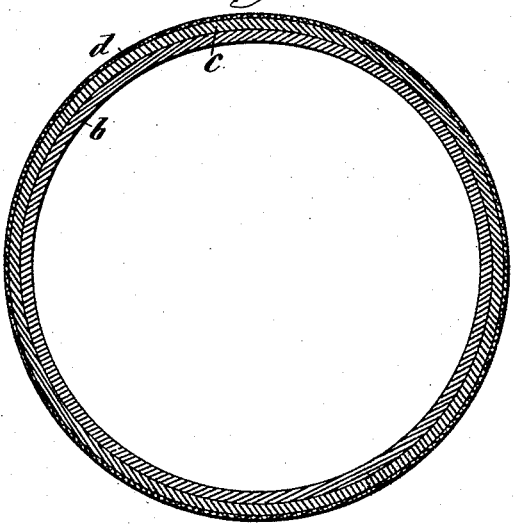

UNITED STATES PATENT OFFICE.

LUCIUS J. PHELPS, OF PASSAIC, NEW JERSEY.

INFLATABLE TUBE.

SPECIFICATION forming part of Letters Patent No. 472,485, dated April 5, 1892.

Application filed December 19, 1891. Serial No. 415,588. (No model.)

*To all whom it may concern:*

Be it known that I, LUCIUS J. PHELPS, a citizen of the United States, residing at Passaic, county of Passaic, and State of New Jersey, have invented certain new and useful Improvements in Inflation-Tubes, fully described and represented in the following specification and the accompanying drawings, forming a part of the same.

The object of the invention is to provide an improved rubber tube or bag which shall be so constructed that punctures produced therein, as by a pin or similar sharp instrument, shall be automatically closed to prevent the escape of the gas or liquid contained therein.

While the invention is of general application in all constructions employing rubber tubes or bags for holding compressed air or other gases or liquids, the invention has been designed in connection with the inflation-tubes used in pneumatic tires on bicycles and tricycles, and the invention will be illustrated and described as embodied in constructions adapted especially for use in such tires.

The invention depends upon the following principles: If a sheet of rubber be compressed and then punctured, the hole will immediately close, the edges of the wound being pressed together by the expansion of the rubber. Carrying this principle into practice in the construction of inflation-tubes, I form my inflation-tube with a layer of rubber compressed and held from expansion, so that any puncture produced therein will be immediately closed up, as above described. Further, when a tube consisting of a number of independent layers of thin rubber thus compressed is punctured the forcing together of the particles of the rubber to close the puncture will result in a change of position of the layers, so that it is almost impossible that the points of puncture in the different layers shall lie exactly opposite each other. When a tube formed of such layers is punctured, partially collapsed, and reinflated, moreover, the return of the layers to their normal position will with almost absolute certainty result in the shifting of the parts of the layers, so that the points of puncture will not come in line with each other, and unless they are perfectly in line the air cannot escape, as the layers will be held firmly together by the pressure of the air in the inflation-tube. Further, if a sheet of rubber be stretched or expanded and then punctured the hole will open, and if a tube of such expanded rubber be placed outside the tube of compressed rubber previously described and both be punctured the rubber of the inner tube will be forced out by the pressure in the tube into the opening in the outer tube, and the lips of the puncture in the inner tube will thus be pressed more closely together. I preferably employ all these principles in forming my improved inflation-tube; but I may omit features based on one or more of them; and my invention therefore consists in an inflation-tube having a tube formed of a plurality of layers of thin compressed rubber or similar material, in an inflation-tube having an inner tube of compressed rubber or similar material, and a tube of expanded rubber outside of and cemented or otherwise secured to the same throughout its surface, and in various specific constructions, and a method of forming a tube of compressed rubber or similar material, all of which will be particularly described hereinafter, and specifically pointed out in the claims.

In the accompanying drawings, in which I have shown my improved inflation-tube in its preferred form as adapted for use in pneumatic tires and certain modifications thereof, Figure 1 is a cross-section of an inflation-tube having an inner tube consisting of a series of thin layers of compressed rubber and a tube outside the same formed of a comparatively thick layer of compressed rubber and an outer tube of expanded rubber, as above described. Fig. 2 is a cross-section of an inflation-tube, omitting the tube formed of thin layers.

Referring now especially to Fig. 1, *a* is the inner tube, composed of several independent layers of thin compressed rubber. The number of these layers may be varied; but there will preferably be four or more, in order to insure the proper action of this portion of the tube, four such layers being shown in the construction illustrated. The tube *b* outside the tube *a* is of comparatively thick compressed rubber, and *c* is a tube of expanded rubber outside of and secured to the tube *b*. The inflation-tube will preferably be completed, as usual, by a cover *d* outside of the outer rubber tube *c* and inclosing the inflation-tube on all sides, so as to strengthen the tube and prevent bursting. The layers of tube $a$ are made of vulcanized rubber to permit of their movement on each other; but the rubber of tube $b$ may be unvulcanized, if preferred.

The tube composed as shown is preferably made as follows, and the method of compressing the rubber of tube $b$ forms in itself a part of the present invention: I first construct the inner tube $b$ about one-third larger in diameter than normal and place it upon a bar of a size equal to the interior diameter of the tube. I then take a sheet of rubber and stretch it to about twice its normal width, and in this stretched condition wind it upon and cement it to the tube $b$ upon the bar, preferably by applying cement to both the tube and the sheet, this stretched rubber sheet forming the outer rubber tube $c$. When the bar is removed from the inside of the tube $b$, the contraction of the outer tube $c$ will contract the inner tube $b$ and compress the rubber of the same evenly throughout. I then construct the tube $a$ of several independent layers of thin rubber, preferably four or more, cementing the edges of the sheets forming this tube separately, so that the sheets may expand and contract independently of each other when they are brought together to form the tube. This tube is made slightly larger than the inside diameter of the outer tube $b$, so that when placed within the latter the rubber of the inner tube will be compressed. The canvas cover $d$ is then applied and cemented to the complete tube; or the tube may be provided with a strengthening and protecting covering of any other suitable construction and applied in any suitable manner or may be used for certain purposes with no outer covering. When such a tube is punctured, as with a pin, for example, the outer tube $c$ of expanded rubber will open the wound and the second layer will close the hole promptly by expansion of the compressed rubber. The air-pressure also forces the rubber of tube $b$ out into the hole in tube $c$, and the lips of the opening in tube $b$ are thus pressed together. The inner tube $a$ also serves the same function of closing the puncture by expansion of the compressed rubber and through failure of the punctures in the different layers to register. When the tube is inflated, moreover, and the layers of the tube $a$ brought back to their normal position by the air-pressure, it is almost impossible that the points of puncture in all of them will exactly coincide, and the hole will therefore be permanently closed.

While I prefer to use all three tubes $a$ $b$ $c$, operating as above described, it is evident that I may use but one of the tubes $a$ $b$ with the outer tube $c$ and that the outer tube also may be omitted.

In Fig. 2 I have shown a construction in which the tubes $b$ $c$ and the cover $d$ only are used, the inner tube $a$ being omitted.

While the invention has been shown as applied to an inflation-tube for use in tires in which the inflation-tube and outer envelope are separate, it will be understood that it is applicable, also, in all classes of tires employing an air-cushion, and generally in all constructions employing a rubber tube or bag of any form for holding fluid under pressure, and by the term "inflation-tube" I intend to cover all such constructions, whether used with gases or liquids.

What I claim is—

1. An inflation-tube having a tube formed of a plurality of independent layers of compressed rubber, substantially as described.

2. An inflation-tube having a tube formed of a plurality of independent layers of thin compressed rubber and a tube outside the same formed of a single comparatively thick layer of compressed rubber, substantially as described.

3. An inflation-tube having a tube formed of a plurality of independent layers of thin compressed rubber, a tube outside the same formed of a single comparatively thick layer of compressed rubber, and a tube of expanded rubber outside the latter, substantially as described.

4. An inflation-tube having a tube formed of a plurality of independent layers of thin compressed rubber, a tube outside the same formed of a single comparatively thick layer of compressed rubber, a tube of expanded rubber outside the latter, and a cover outside the expanded tube, substantially as described.

5. An inflation-tube having a tube of compressed rubber and a tube of expanded rubber outside and secured to the same throughout its surface, substantially as described.

6. An inflation-tube having a tube of compressed rubber, a tube of expanded rubber outside and secured to the same throughout its surface, and a cover outside the expanded tube, substantially as described.

7. The method of forming a tube of compressed rubber, which consists in forming a rubber tube of larger diameter than normal and cementing to it an outer tube of expanded rubber, so that the inner tube is compressed by the contraction of the outer tube, substantially as described.

8. The method of forming a tube of compressed rubber, which consists in placing a rubber tube of larger diameter than normal upon a bar, cementing to the tube a sheet of expanded rubber, and withdrawing the bar from the tube, substantially as described.

In testimony whereof I have hereunto set my hand in the presence of two subscribing witnesses.

LUCIUS J. PHELPS.

Witnesses:
T. F. KEHOE,
C. J. SAWYER.